No. 727,634. PATENTED MAY 12, 1903.
M. R. HUTCHISON.
TELEPHONE.
APPLICATION FILED NOV. 15, 1901.

NO MODEL.

Witnesses
Inventor
M. R. Hutchison
By his Attorney

No. 727,634. Patented May 12, 1903.

UNITED STATES PATENT OFFICE.

MILLER REESE HUTCHISON, OF NEW YORK, N. Y., ASSIGNOR, BY MESNE ASSIGNMENTS, TO HUTCHISON ACOUSTIC COMPANY, A CORPORATION OF NEW JERSEY.

TELEPHONE.

SPECIFICATION forming part of Letters Patent No. 727,634, dated May 12, 1903.

Application filed November 15, 1901. Serial No. 82,480. (No model.)

*To all whom it may concern:*

Be it known that I, MILLER REESE HUTCHISON, a citizen of the United States, residing at the city of New York, in the borough of Manhattan and State of New York, have invented certain new and useful Improvements in Telephones, of which the following is a full, clear, and exact description.

This invention relates to telephonic apparatus, and has special reference to the mounting of the diaphragm, with the object of obtaining good electrical connection between the diaphragm and case of the instrument and to impart to the diaphragm a constant radial inward pressure, whereby it will be under a constant strain or buckle which will increase its sensitiveness in operation.

Figure 1:
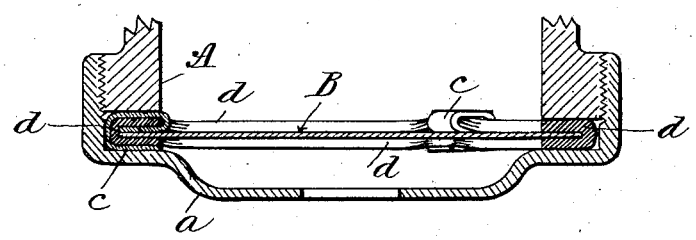
Figure 2:
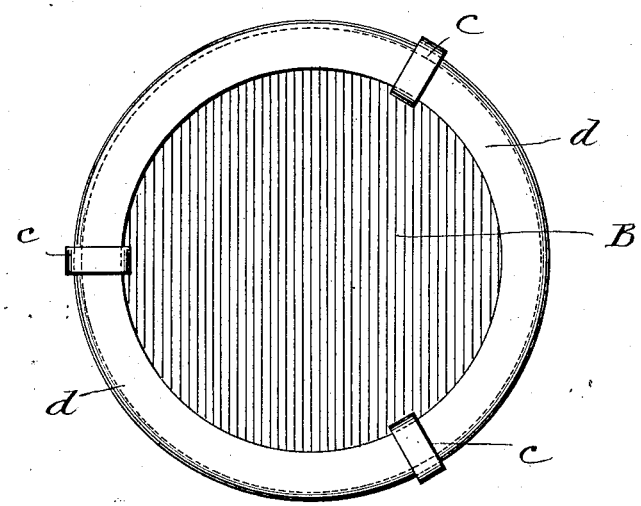

In the accompanying drawings, illustrating my invention, Figure 1 is a section of a portion of a telephonic instrument, showing the diaphragm and its mounting; and Fig. 2 is a plan of the diaphragm.

A indicates a portion of the casing of a transmitter, receiver, or other instrument having a diaphragm adapted to vibrate, $a$ being a cap covering the diaphragm and by which it is held in place at the edges.

B is the diaphragm. In order to give to the diaphragm a slight bias to buckle, I place around its edges an elastic band $d$, such as an ordinary rubber band, which normally is of less circumference than the diaphragm, so that the band will be under tension when adjusted to the diaphragm. The said elastic band is so placed over the edge of the diaphragm that it will cover a portion of the upper and lower surfaces thereof and will pass over the edge in the nature of a binding. The pressure furnished by this band will obviously give a slight arch or tendency to arch to the diaphragm, and it is well known that a diaphragm under such conditions is more sensitive to sound-waves.

To obtain good electrical connection between the diaphragm and the metallic portions of the casing, in which it is clamped at the edges, and also to further increase the bias to buckle, I provide three metallic clips $c$, consisting merely of flat strips of metal. In adjusting these to the diaphragm I insert one end of the strip under the elastic band $b$ in a radial direction, then bend the strip over the entire outside of the band, thus embracing both surfaces of the diaphragm and exposing the metal strip to contact with the cap $a$ and the main case A. These three clips are preferably placed around the edge of the diaphragm one hundred and twenty degrees apart, and when the cap $a$ is screwed down against the clips the pressure on the clips furnishes good contact and at the same time slightly increases the radial pressure on the diaphragm.

It will be seen that the elastic band, which is preferably of soft rubber, furnishes a cushion between the upper and lower faces of the diaphragm and the case in which it is clamped. This is a desirable mounting for the diaphragm, since it is thereby left perfectly free to vibrate. At the same time it becomes necessary to furnish electrical connection between the diaphragm and the casing. Hence the clips of the peculiar form described are used.

Having described my invention, I claim—

1. A diaphragm adapted to respond to sound-waves, a case or frame in which the rim of the diaphragm is clamped, a binding of insulating material around the edge of the diaphragm and metallic clips extending under the binding to make contact with the diaphragm and thence leading into contact with the clamping-surfaces of the case or frame.

2. A diaphragm adapted to respond to sound-waves, in combination with a binding of non-conducting material embracing its edge, and a plurality of metallic clips each consisting of a strip of metal, one end of which passes under the binding and in contact with the diaphragm and leads thence outward and around both surfaces of the binding, and a case of conducting material in which the edge of the diaphragm is clamped.

In witness whereof I subscribe my signature in presence of two witnesses.

MILLER REESE HUTCHISON.

Witnesses:
FRANK S. OBER,
WALDO M. CHAPIN.